United States Patent Office 3,343,227
Patented Sept. 26, 1967

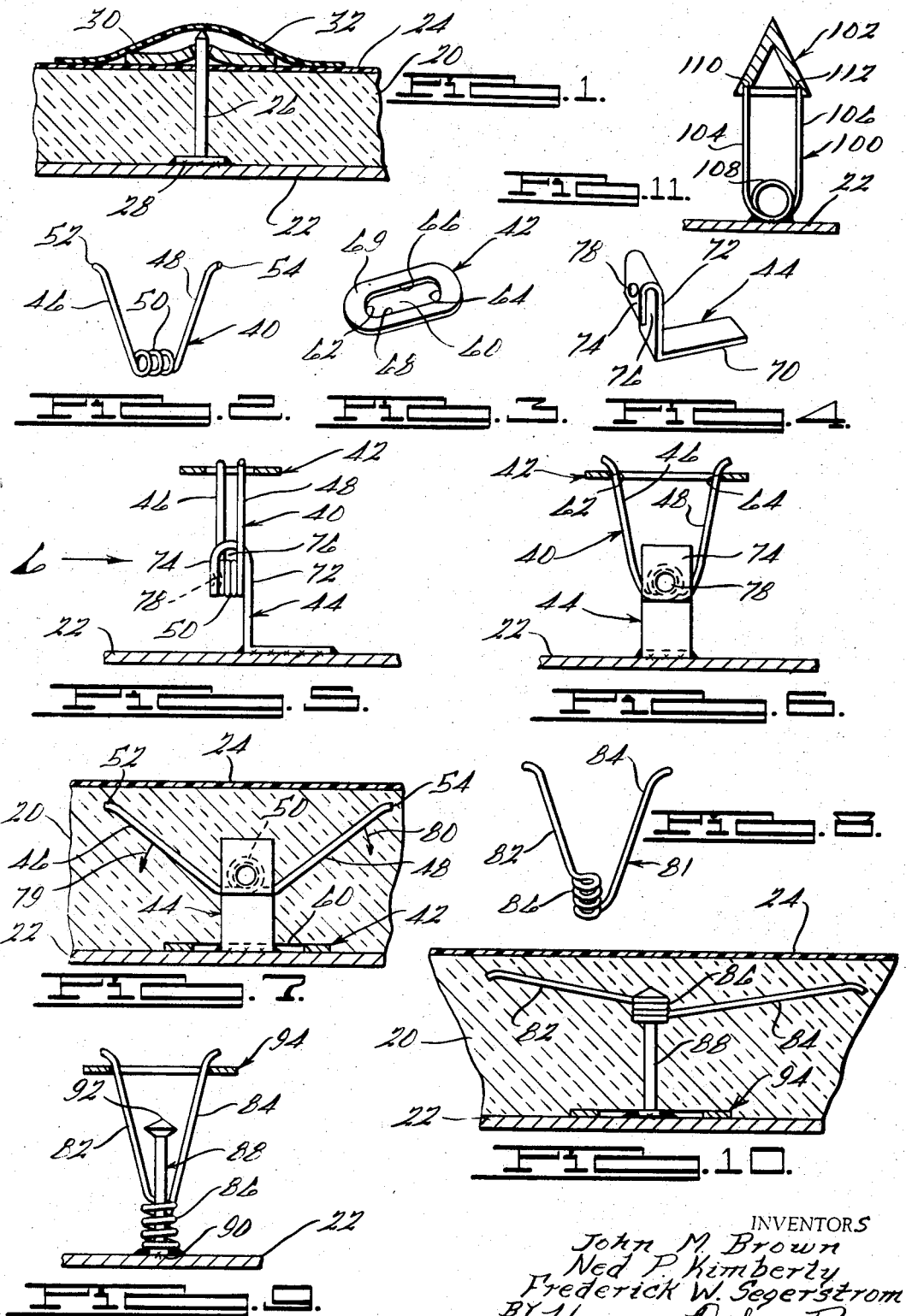

3,343,227
FASTENING METHOD AND APPARATUS
John M. Brown, 26705 York Road, Huntington Woods, Mich. 48070; Ned P. Kimberly, 10622 W. Outer Drive, Detroit, Mich. 48223; and Frederick W. Segerstrom, Perrysburg, Ohio 43551
Filed Dec. 13, 1965, Ser. No. 513,357
21 Claims. (Cl. 24—73)

This invention relates to means for and methods of attaching one material to another material.

In the illustrative embodiment of the invention, there is disclosed means for and methods of attaching a relatively soft material, such as insulation composed of a mass of relatively resilient fibers, to a relatively hard backup material, such as a metal plate or the like used for duct work in heating and cooling systems.

The primary object and purpose of the invention is to provide new and improved means for and methods of attaching a pierceable material composed of, for example, a mass of resilient fibers to metal duct work of the type used in heating and cooling installations.

Referring now to the accompanying drawing in which an illustrative embodiment of the invention is shown:

FIGURE 1 is an illustration of presently utilized prior art means and methods of attaching insulation to duct work;

FIG. 2 is a perspective view of a part of a new and improved fastener arrangement;

FIG. 3 is a perspective view of another part of an improved fastener arrangement;

FIG. 4 is a perspective view of still another part of an improved fastener arrangement;

FIG. 5 is a side elevational view, partly in section, of an assembly of the parts shown in FIGS. 1–3;

FIG. 6 is another side elevational view, partly in section of the assembly of parts shown in FIG. 5;

FIG. 7 is a side elevational view of the assembly of parts shown in FIGS. 5 and 6 illustrating the use of the parts to hold insulation or the like onto a support plate or the like;

FIG. 8 is a perspective view of an alternative design of the part shown in FIG. 2;

FIG. 9 is a side elevational view, partly in section, of an assembly of parts having an alternative design;

FIG. 10 is a side elevational view, partly in section of the assembly of parts shown in FIG. 9 illustrating the use of the parts to hold insulation or the like on metal duct work or the like; and FIG. 11 is a side elevational view, partly in section, of an alternative embodiment of the invention.

Referring now to the drawings, FIGURE 1, the invention is shown to relate to the attachment or fastening or securing or holding of a piece of material 20 to a supporting or holding or backup or backing plate 22. In the illustrative embodiment, the material 20 comprises a piece of insulation material formed by layers of fibrous or fiber-like components which are resilient, compressible, and relatively easily pierced or separated by a relatively sharp instrument or tool, the material 20 is conventionally provided with an outer skin or covering 24 which forms an impervious barrier to prevent vapor or moisture in any form from passing into or out of the insulation material. The outer skin 24 is conventionally in the form of a plastic layer or coating attached to the surface of the insulation material.

A common prior art fastening arrangement is shown in FIG. 1 to comprise a nail 26 welded to the plate as indicated at 28 and extending transversely away from the plate through the insulating material 20 and the skin 24. Installation is accomplished by forcing the insulation material onto suitably spaced nails on the backup plate until the insulation material abuts the plate. In order to secure the insulation material in place, conventional spring clip devices 30 are secured to the protruding ends of the nails. A section of adhesive tape 32 or the like is then placed over the nail and spring clip to seal the puncture in the skin caused by the nails.

The presently preferred forms of the invention, as illustrated in FIGS. 2–11, utilize three basic parts comprising a gripping or securing means 40, FIG. 2, movable from a piercing position to a gripping position for securing the insulation material in place on the backup plate; a retainer means 42, FIG. 3, movable from a retaining position for retaining the gripping means in the piercing position to a release position permitting movement of the gripping means from the piercing position to the gripping position; and a bracket means 44 for attaching the gripping means and the retainer means on the backup plate. While three basic parts are illustratively shown, it will be understood that the functions performed by each part might also be incorporated in alternative embodiments in a lesser or greater number of parts of varying design.

Referring now to FIG. 2, the gripping means 40 is shown to comprise a spring wire member formed into a substantially V-shaped configuration with spaced leg or arm portions 46, 48 integrally interconnected by a coil portion 50. The ends 52, 54 of the leg portions are preferably slightly outwardly turned and terminate in relatively sharp small diameter surfaces which will relatively easily penetrate or pierce the insulation material 20. Thus, the leg portions comprise a curved connecting section, a substantially straight intermediate section, and a curved terminal section. The coil portion 50 has a central longitudinal axis which extends substantially transversely to the leg portions. The spring wire member is formed to a configuration in which, in a normal unbiased condition, as approximated in FIG. 7, the leg portions will extend outwardly from one another and be spaced at a sufficiently wide angle to perform a gripping function in the gripping position as hereinafter described in further detail.

Referring now to FIG. 3, the retaining means 42 is shown to comprise a washer-like element having a central opening 60. In the illustrative embodiment, the opening 60 is elongated with opposite sides 62, 64 being spaced a distance equal to a distance the leg portions 46, 48 are to be held in spaced relationship to one another in the piercing position (FIG. 6). Opposite sides 66, 68 are spaced a distance sufficient to enable the retaining means to slide over the gripping means and the bracket means from a retaining position (FIGS. 5 and 6) in engagement with the arm portions 46, 48 to a release position (FIG. 7) located below the gripping means adjacent the plate. The width of the rim 69 of the washer is sufficient to obtain good surface engagement with the insulation material during installation so as to cause the retaining means to be moved from the retaining position to the release position as the insulation material and plate are moved relative to one another into closely spaced or abutting relationship.

Referring now to FIG. 4, the bracket means 44 is shown to comprise a base portion 70 and a support flange portion 72. Terminal flange portion 74 is reversely bent to define a supporting pocket 76 into which an embossment or the like 78 protrudes.

In the assembled position of the fastener parts, as shown in FIGS. 5 and 6, the bracket means 44 is welded or otherwise mounted on the backing plate 22. Gripping means 40 is mounted in the supporting pocket 76 on the bracket means 44 between flange portions 72, 74 and frictionally held thereby on embossment 78. The central longitudinal axis of the coils 50 extends substantially parallel to the plate 22 and the arm portions 46, 48 extend outwardly transversely thereto. In the piercing position, the arm portions are resiliently forced toward one another and positioned within the central opening 60 of retainer means 42. Due to frictional engagement of the arm portions along the opposite edges 62, 64 of the opening in the retainer means, the arm portions are resiliently held in a piercing position ready for insertion into the insulation material 20.

The method of mounting of the insulation material comprises prepositioning the gripping means in the piercing position on the plate 22 and holding the gripping means in the piercing position. Then, the insulation material is pressed toward the plate 22 and onto the protruding ends 52, 54 of the wire element. The ends 52, 54 pierce the insulation which moves onto and into surface engagement with the retainer means 42. Continued movement of the insulation material 20 forces the retainer means along the arm portions 46, 48 of the gripping means toward the bracket means and the plate 22. As the retainer means moves away from the end portions 52, 54, the spring tension in the arm portions 46, 48 moves them away from one another into the insulation and toward the plate 22. Thus, as the insulation is pressed toward the plate 22, the spring force in the arm portions also exerts a force tending to pull the insulation toward the plate and around the fastener parts. As the insulation is pressed toward the plate, the retainer means 42 moves from the retaining position of FIGS. 5 and 6 to the release position of FIG. 7 by sliding movement over the coil portion 50 and the bracket means 44. In the fastened position of FIG. 7, the arm portions 46, 48 are wide spread and, preferably, still somewhat short of their normal unbiased position so as to exert a retaining force on the insulation exerted toward the plate as indicated by arrows 79, 80. The ends 52, 54 terminate short of the upper surface of the insulation so that the vapor barrier is not broken. The ends 52, 54 are preferably spaced closely adjacent to the vapor barrier so as to provide a maximum amount of insulation material between the spring arms and the plate.

Referring now to FIG. 8, an alternative form of gripping means 81 is shown to comprise a spring wire element having spring arm portions 82, 84 connected by a coil portion 86 which has a central longitudinal axis extending substantially parallel to the arm portions. As shown in FIG. 9, the gripping means may be mounted on bracket means 88 in the form of a post member welded at one end 90 to the plate and terminating in a spiked portion 92. Coil portion 86 is slidably supported on the post member and a retainer means 94, as previously described, is utilized to hold the arm portions 82, 84 in a compressed condition in a piercing position. The insulation material is pressed onto the plate, as before, with the retainer means sliding downwardly from the retaining position to the release position and the spring arms piercing the insulation and moving outwardly away from one another into the insulation and terminating adjacent the upper surface of the insulation and resiliently holding the insulation in contact with the plate. It may be noted that the coil portion of the gripping means is free to slide on the post as necessary. In the illustrative embodiment, the coil portion initially abuts the plate 22 as the piercing of the insulation begins but is free to move along the post 88 as the position of the insulation changes and the spring arms 82, 84 more deeply penetrate the insulation while the space between the arms widens.

Referring now to FIG. 11, an alternative form of the invention is shown to comprise a gripping means 100, movable from a piercing position to a gripping position as hereinbefore described, and a retainer means 102 movable from a retaining position to a release position as hereinafter described. The gripping means comprises a spring wire member having arm portions 104, 106 and a coil portion 208 or the like mounted on a plate 22 as previously described. The retaining means 102 is in the form of a removable cap having a pointed piercing conical outer peripheral configuration and having holding means 110, 112 for the spring wire arm portions. In the illustrative embodiment, the retaining means 102 is hollow and the holding means are in the form of grooves or slots provided in the inner periphery of the hollow cap. Thus, as the insulation material is pressed onto the plate over the pointed end of the retaining means, the retaining means holds the arm portions in a compressed position. The cap is made of magnetic material so as to be adapted to be moved to the release position by magnetic attraction. When the insulation material has been pressed into place on the plate 22 over the retainer means and the gripping means, a magnet is passed along the outer surface of the insulation and the retaining means are moved away from the gripping means arm portions into the insulation to release the arm portions and permit them to move outwardly into gripping engagement with the insulation material.

Since the invention may be variously otherwise embodied without departing from the basic principles hereinbefore disclosed, it is intended that the appended claims be construed to provide adequate protection for the inventive concept as employed in alternative embodiments except as limited by the prior art.

What is claimed is:

1. Apparatus for fastening a layer of insulation-like material to a backing member comprising:
  support means attached to said backing member; and securing means mounted on said support means,
    said securing means including outwardly extending arm means,
    said arm means being resiliently movable between a piercing position extending substantially transversely away from said backing member and a holding position extending substantially parallel to said backing member,
    releasable arm holding means for holding said arm means in the piercing position,
    said arms means being pierceably engageable with said insulation-like material in the piercing position, and
    said arm means being resiliently movable from the piercing position to the holding position as said insulation-like material is pressed into piercing engagement with said arm means and onto said arm means and into engagement with said backing member while simultaneously releasing said holding means.

2. The invention as defined in claim 1 and wherein said securing means is formed by spring wire means or the like.

3. The invention as defined in claim 2 and wherein said spring wire means comprises V-shaped arm portions forming said arm means.

4. The invention as defined in claim 3 and wherein one of said arm means extends outwardly in one direction and another of said arm means extends outwardly in the opposite direction.

5. The invention as defined in claim 4 and wherein said one of said arm means and said other of said arm means are interconnected by an integral coil of spring wire.

6. The invention as defined in claim 5 and wherein said integral coil of spring wire extends substantially transversely to said arm means.

7. The invention as defined in claim 5 and wherein said integral coil of spring wire extends substantially parallel to said arm means.

8. The invention as defined in claim 3 and wherein each of said arm portions comprises a curved connecting section, a substantially straight intermediate section, and a curved terminal section.

9. The invention as defined in claim 1 and wherein said arm holding means is movable from a holding position spaced outwardly from said backing member to a release position spaced closely adjacent said backing member between said insulation-like material and said backing member.

10. The invention as defined in claim 9 and wherein said holding means having a central opening, and said central opening being of a size to receive said arm means therewithin and to frictionally retain said arms means in the piercing position until said holding means is moved transversely toward the holding position.

11. The invention as defined in claim 10 and wherein said central opening also being of size permitting sliding movement of said holding means from the piercing position to the holding position.

12. The invention as defined in claim 11 and wherein said central opening slidably receives said supporting means.

13. The invention as defined in claim 2 and wherein said support means comprises a bracket member having a base flange extending substantially parallel to said backing member and fixedly attached thereto and having a support flange extending outwardly transversely to said base flange.

14. The invention as defined in claim 13 and wherein said support flange being reversely bent and forming a support pocket for said spring wire element.

15. The invention as defined in claim 13 and wherein said spring wire means includes a coiled central portion mounted in said support pocket.

16. The invention as defined in claim 15 and wherein said coiled central portion has a longitudinal axis extending substantially transversely to said support flange and being parallel to said backing member.

17. The invention as defined in claim 5 and wherein said coil of spring wire has a longitudinal axis extending substantially transversely to said backing member, and said support means slidably supports said coil of spring wire.

18. The invention as defined in claim 17 and wherein said coil of spring wire being movable on said support means between a retracted position, located closely adjacent to said backing member in the piercing position prior to piercing movement of the insulation-like material toward the backing member, and an extended position slidably upwardly displaced and spaced from said backing member in the holding position after movement of the insulation-like material toward the backing member.

19. The invention as defined in claim 18 and wherein said holding means is telescopically mounted on said spring wire means and said support means, said holding means being telescopically supported on said arm means and said support means for movement from the piercing position to the holding position.

20. Apparatus for fastening a layer of insulation-like material to a backing member comprising:
gripping means mounted on said backing member,
said gripping means including outwardly extending arm means,
said arm means being resiliently movable between a piercing position extending substantially transversely away from said backing member and a holding position extending substantially parallel to said backing member,
holding means mounted on said gripping means and being movable between a holding position and a release position relative thereto,
said holding means engaging said arm means and holding said arm means in the piercing position,
said holding means being made from magnetic material, and
said holding means being slidably supported relative to said arm means for movement from the holding position to the release position by magnetic attraction to a magnet placed adjacent thereto.

21. The method of fastening a layer of insulation-like material on retainer means on a backing member comprising:
holding said retainer means in a piercing position on said backing member,
placing said insulation-like material on said backing member over said retainer means by piercing engagement therebetween, and
moving said retainer means from a piercing position to a retaining position in said layer of insulation-like materal by magnetic force.

References Cited

UNITED STATES PATENTS 2,232,762  2/1941  Batcheller _____ 85—23

WILLIAM FELDMAN, *Primary Examiner.*

G. WIEDENFELD, *Assistant Examiner.*